United States Patent [19]
Motomiya

[11] Patent Number: 4,639,852
[45] Date of Patent: Jan. 27, 1987

[54] PROCESS CONTROL SYSTEM

[75] Inventor: Takehiko Motomiya, Tokyo, Japan

[73] Assignee: Ohkura Electric Co., Ltd., Tokyo, Japan

[21] Appl. No.: 657,407

[22] Filed: Oct. 3, 1984

[30] Foreign Application Priority Data

Nov. 24, 1983 [JP] Japan ................. 58-221139

[51] Int. Cl.[4] ........................................... G06F 15/46
[52] U.S. Cl. .................................. 364/138; 364/187; 364/900; 371/8
[58] Field of Search .................. 364/131–135, 364/138, 139, 184–187, 200 MS File, 900 MS File; 371/7–13, 16, 20

[56] References Cited

U.S. PATENT DOCUMENTS

| 4,251,858 | 2/1981 | Cambigue et al. | 364/200 X |
| 4,253,148 | 2/1981 | Johnson et al. | 364/200 |
| 4,347,563 | 8/1982 | Paredes et al. | 364/133 X |
| 4,390,953 | 6/1983 | Johnstone | 364/138 X |
| 4,457,772 | 7/1984 | Haynes et al. | 364/476 X |
| 4,539,655 | 9/1985 | Trussell et al. | 364/900 |
| 4,550,375 | 10/1985 | Sato et al. | 364/138 X |

Primary Examiner—Joseph Ruggiero
Attorney, Agent, or Firm—Fleit, Jacobson, Cohn & Price

[57] ABSTRACT

A computer supervising individual controllers has a memory and a programmer, the memory storing a set of operating modules and control information of individual controllers, the programmer making a control program for each controller by providing software wiring of the operating modules based on the control information therefor, whereby the individual controllers are started by the control program and control information from the computer, while during operation the controllers transmit the latest control information to the computer for updating the control information in the computer.

4 Claims, 11 Drawing Figures

| SOFTWARE WIRING 202 | |
|---|---|
| 203a | ADD, SUBTRACT |
| 203b | MULTIPLICATION |
| 203c | DIVISION |
| 203d | SQUARE ROOT |
| 203e | LINEARIZE |
| 203f | PID CONTROL |
| 203g | GAPPED PID |
| 203h | SQU. DEV. PID |
| 203i | FEED FOWARD |
| 203j | SAMPLING CONTROL |
| 203k | UPPE/LOWER LIMIT |
| 203ℓ | |
| 203m | |
| 203n | |

PROCESS CONTROL SYSTEM

BACKGROUND OF THE INVENTION

1. Field of the Invention

This invention relates to a process control system, and more particularly to a centralized supervisory process control system which uses digital controllers for distributed processing.

2. Description of the Prior Art

Figure 1:
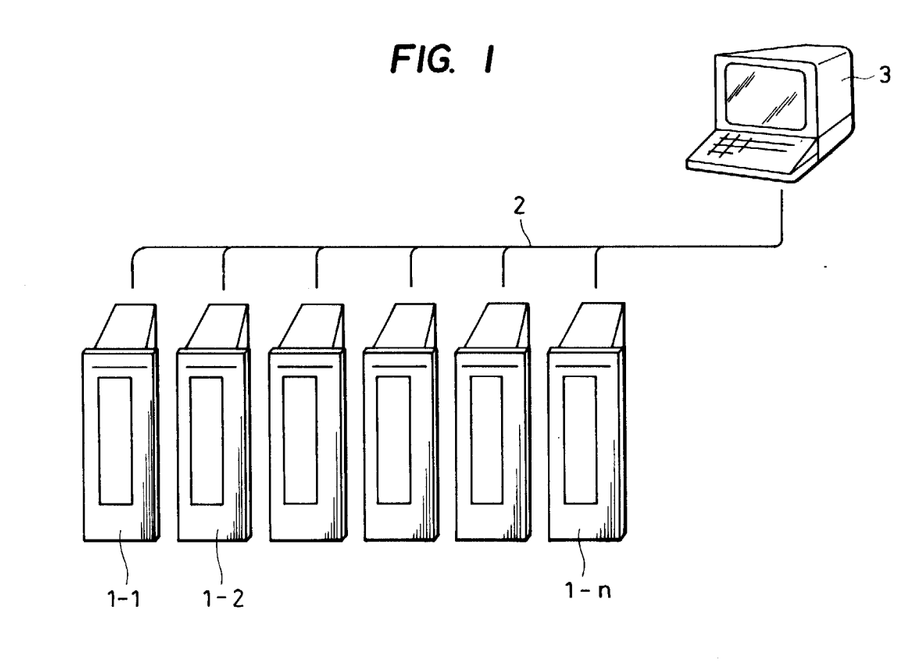
FIG. 1 is a diagrammatic illustration of a process control system having a plurality of controllers for distributed processing which are connected to a supervisory computer.

Referring to FIG. 1 schematically showing a typical centralized process control system, a plurality of digital controllers 1 for distributed processing are connected to transmission lines 2 which lead to a centralized supervisory computer (to be referred to as "supervisory computer", hereinafter) 3. Each controller 1 for distributed processing carries out process control of single-loop or multi-loop type. The function of the supervisory computer 3 includes (i) the centralized supervision of temporary loop parameters, i.e. measured values of various variables, the magnitudes of manipulated variables, and the like of each control loop under its supervision (to be collectively referred to as the "temporary parameters", hereinafter), by collecting them through the transmission lines 2 and displaying them;

(ii) the centralized supervision of control program parameters, i.e., various set points, the proportional gain (or proportional band PB) and the integral action rate (or integral time I) and the derivative action time constant (or derivative time D) of the proportional plus integral plus derivative (P.I.D.) control action, upper/lower limits for alarming, and the like of each control loop under its supervision (to be collectively referred to as the "control parameters", hereinafter), by collecting them through the transmission lines 2 and displaying them; and (iii) centralized supervision and control, such as modification of the above-mentioned control parameters from the supervisory computer 3 through the transmission lines 2.

Figure 2:
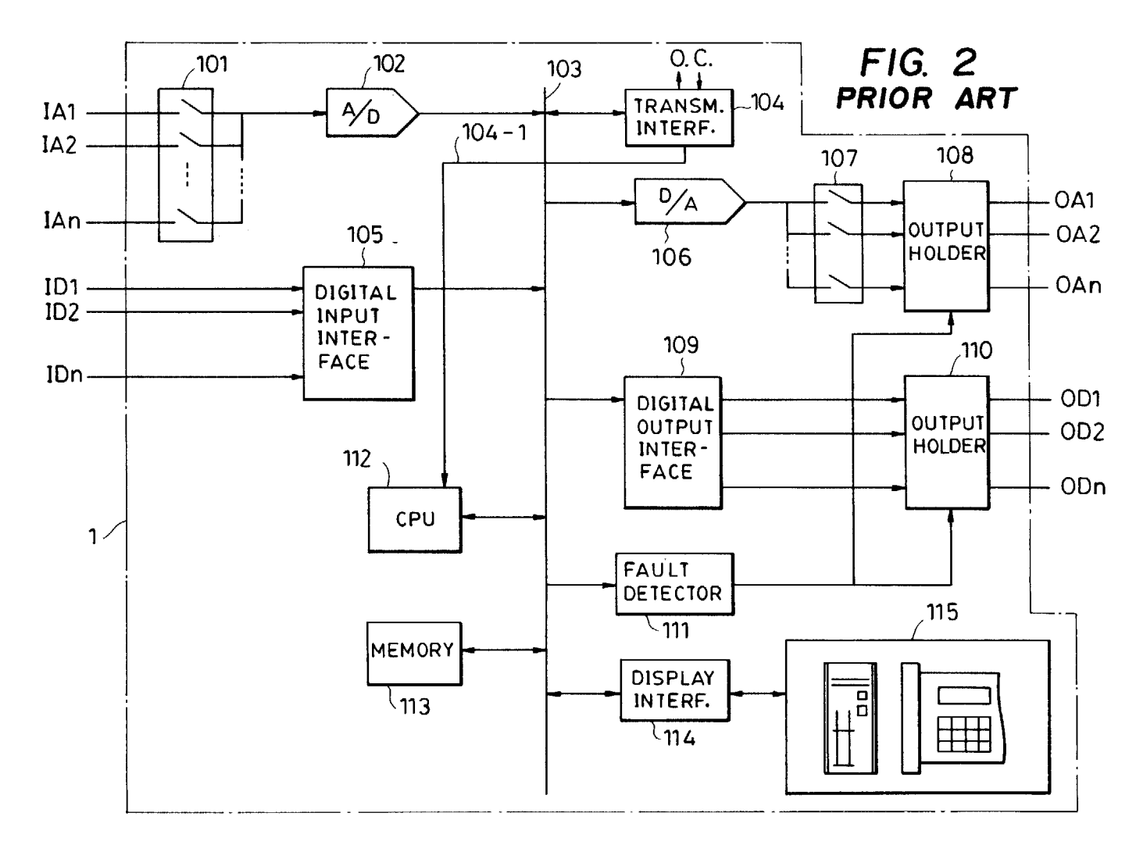
FIG. 2 is a schematic block diagram of a conventional controller for distributed processing.

FIG. 2 shows a block diagram of a typical digital controller 1 for distributed processing of the prior art. Analog input signals IA1 through IAn from a process being controlled are applied to a multiplexer 101, so that they are successively converted into digital signals by an analog/digital converter 102. The digital signals from the analog/digital converter 102 are delivered to a bus 103 and stored in a memory 113. A display with keyboard switches 115 mounted on the front panel and sidewall of the controller 1 is connected the bus 103 through a display interface circuit 114. Digital input signals ID1 through IDn from the process are stored in the memory 113 through digital input interface circuit 105 and the bus 103.

Various data carried by the stored input signals are processed by the control program of the controller 1 at the central processing unit (CPU) 112. The processed signals are applied either to an output holder 108 through a digital/analog converter 106 and a demultiplexer 107, or to another output holder 110 through a digital output interface circuit 109. The output holders 108 and 110 have dual functions; namely, to hold the above output signals for a period corresponding to the sampling period of the digital system of the controller 1 and, in the case of any fault in the controller 1, to hold the levels of above output signals immediately before the fault occurrence. A transmission interface circuit 104 connected to the bus 103 acts to transmit data from the controller 1 toward the outside circuit and to collect data from the outside circuit. Preferably, the transmission interface circuit 104 is connected to the transmission line 2 of FIG. 1.

The software of the digital controller 1 for distributed processing is often in the form of a program mounted on a read only memory (ROM). More particularly, from the standpoint of standardization and interchangeability, subroutines for those unit mathematical operations and unit control operations which are expected to be frequently used are written on a ROM as software modules (to be referred to as the "operating modules", hereinafter), as shown by the operating modules or subroutines 203a through 203k on a ROM 203 of FIG. 3A. Preferably, the ROM 203 is made as a part of the memory 113 of FIG. 2, and it may be in the form of an erasable programmable ROM (EPROM) or a mask ROM. A desired control program of software is written by connecting only those operating modules which are necessary for actual control by a software wiring 202 to be described hereinafter.

The software wiring 202 of the operating modules will be described by referring to an example of cascade control of FIG. 3B. In the control system of FIG. 3B, to control the temperature in the furnace 21, the fuel flow through a fuel pipe 22 is detected by a flow meter 23, and the flow rate data signal is delivered to the controller 1. Based on temperature data signal from a thermometer 24 monitoring the temperature in the furnace 21 and the above flow rate data signal, the controller 1 manipulates the opening of a fuel valve 25, so as to control the combustion at a burner 26 and accordingly the temperature in the furnace 21.

Figure 3A:
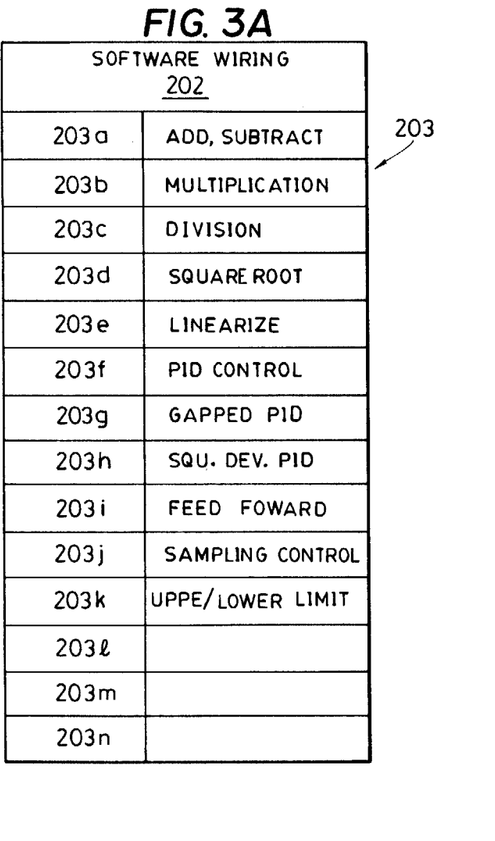
FIG. 3A, FIG. 3B, and FIG. 3C are explanatory diagrams of the formation of control program in the conventional controller for distributed processing.
Figure 3B:
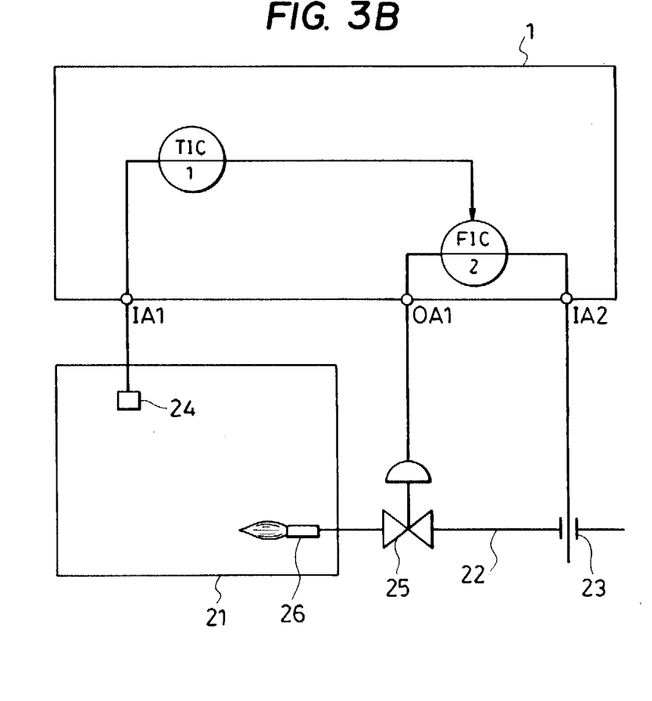
Figure 3C:
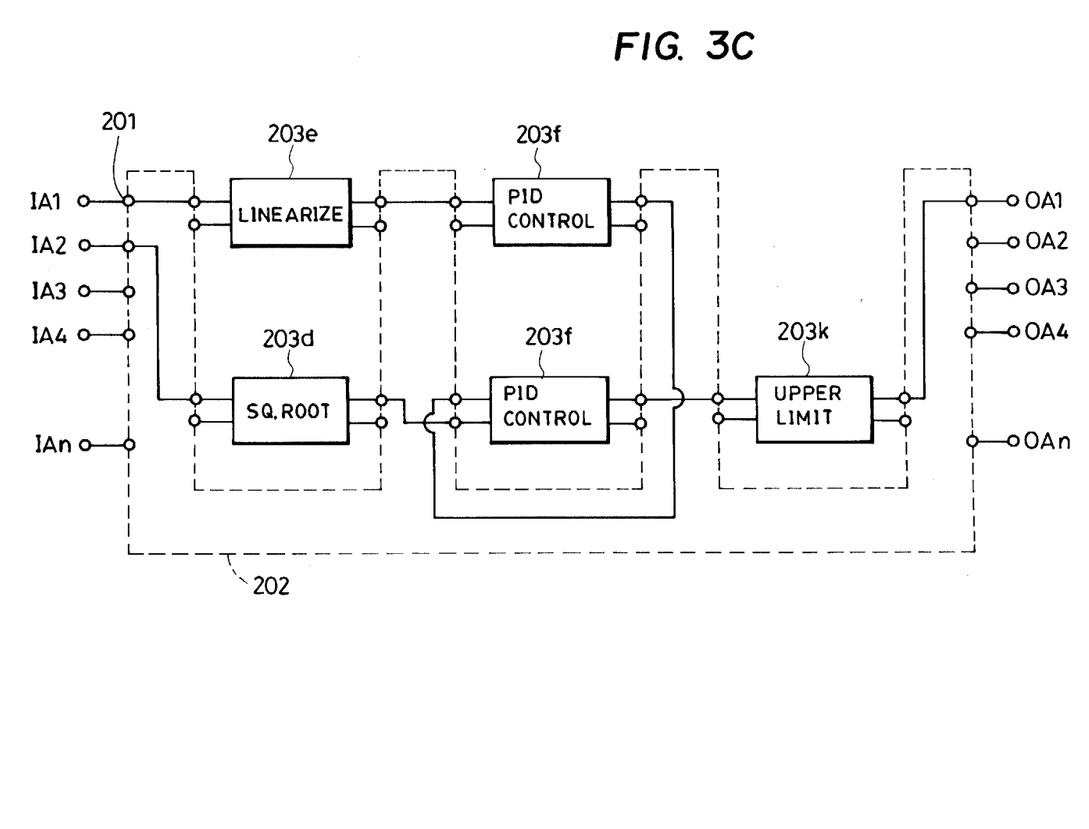

Referring to FIG. 3C showing a block diagram of the software for effecting the above cascade control, the temperature data signal is represented by an analog input signal IA1 applied at an input point 201. To make correction for the non-linearity of the detector, or the thermometer 24, the analog input signal IA1 is processed by a linearizer module 203e. The corrected signal is applied to a PID module 203f. The output signal from this PID module 203f is used as a set point for another PID module 203f. Similarly, the operating modules in the block diagram of FIG. 3C are connected. It is noted that the connection among the operating modules of FIG. 3C is made not by hardware wiring but by software wiring.

In FIG. 3C, such software wiring 202 is enclosed by the broken lines. In practice, the entire software wiring 202 is preferably written on a ROM by a ROM writer in the field so as to meet the needs of actual processes to be controlled. The ROM thus written is mounted on the controller 1 to make it ready for control operation. Alternatively, the software wiring may be loaded on a non-volatile memory of the controller 1 from a keyboard or a cassette recorder before starting the control operation.

Accordingly, as far as the hardware is concerned, the above-described controller 1 for distributed processing intrinsically lacks individuality, and its individuality is given in the field by providing the software wiring when it is applied to the actual plant. Thus, the controllers which lack hardware individuality can be universally applied to a variety of plants by giving required individuality through software wiring in the field. However, the conventional control system using such controllers has the following shortcomings.

(a) The controller tends to have as many software operating modules mounted thereon as possible provided that they have a finite probability of actual use in the field, so that the number of operating modules increases with the expansion of its application, resulting in an increased memory capacity. Thus, the controller having a wide application has an increased memory capacity, and hence its mean time between faults (MTBF) is reduced and it becomes costly and uneconomical.

(b) Although it is true that the number of plants requiring a large number of operating modules to form complicated control loops and to carry out complicated control operations is increasing, the majority of the controllers actually installed are still used with simple loop formation and comparatively simple control operations. Thus, for controllers to be used with simple control loops, provision of those software modules which are not used is uneconomical.

To avoid this disadvantage, one may think of provision of two kinds of controllers, one with simple formation and one with highly complicated formation, but this is against the merit of standardization and interchangeability.

(c) In the above digital controller of the prior art, the software is complicated. Besides, the operation of the ROM writer for making the software wiring requires certain degree of experience.

(d) Before replacing a faulted controller with a spare controller, it is necessary to write the software wiring on a ROM by a ROM writer and mount the ROM on the spare controller. Alternatively, the software wiring may be loaded from a keyboard or a cassette. In any case, due to the need of the software wiring, very quick replacement with the spare controller is hard to achieve even in emergency.

(e) When a fault occurs, the following difficulties are encountered in the conventional controller.

As OUTPUT HOLD, in case of a fault, the manipulated variable to be applied to the process being controlled is held at a level immediately before the occurrence of the fault, and such level of the manipulated variable is kept until the recovery from the fault. However, this method cannot respond to any change in the process after the occurrence of the fault, so that it is very dangerous to use this method as a backup for an extended period of time.

As HARD MANUAL, a circuit for manual control of the manipulated variable applicable to the process being controlled is separately prepared by using only those instruments which have a comparatively low rate of fault, such as the power source, potentiometers, and the like, so that upon detection of the occurrence of a fault, the output from the controller is automatically switched to that of the above circuit for manual control. With the HARD MANUAL, continuous supervision by operating persons and manual control operation are necessary until the recovery of the normal operation either by the repairing of the faulted controller or by replacement of the faulted controller with the spare controller. However, it is practically impossible to effect manual backup operation in case of a control system including a complicated loop formation.

In short, the controller of the prior art does not have any satisfactory backup in the case of fault.

SUMMARY OF THE INVENTION

Therefore, an object of the present invention is to obviate the above-mentioned shortcomings of the prior art by providing an improved process control system having an optimal cost-performance relationship, which control system may include functions of backup for fault and fault diagnosis.

To fulfil the above object, a preferred embodiment of the process control system of the invention uses a a plurality of controllers, each having a transmission interface, an initial loader means, and a random access memory (RAM). The operating modules on a ROM are eliminated from the controller, so as to reduce the cost of the individual controllers.

The controllers are connected to a supervisory computer through transmission lines. The supervisory computer has a memory which stores control information covering the operating modules, operating loops, operating modes, and various parameters for all the controllers under its supervision. The supervisory computer also has a programmer means for producing control programs for individual controllers based on the control information stored in the memory thereof, for instance by selecting necessary operating modules from the memory and developing a software wiring for connecting the selected operating modules based on the operating loop and operating mode information stored in the memory depending on the plant. Further, the supervisory computer has a transmission control means for controlling the transmission between the supervisory computer and the controllers.

Accordingly, the supervisory computer transmits a predetermined initial control program and related parameters to each controller so as to start it with the thus trasnmitted predetermined initial control program and related parameters. During the operation, the controllers transmit various parameters, such as measured values of controlled variables, magnitudes of manipulated variable, and the like, to the supervisory computer, so as to update those parameters stored in the memory thereof.

A fault detector circuit may be included in each controller. Upon detection of a fault, the fault detector circuit automatically causes both reset of the CPU and hold of output levels in the faulted controller and transmits a detection signal to the supervisory computer. In response to the detection signal, the supervisory computer retransmits the control program and related parameters of the faulted controller, which have been sent to the supervisory computer immediately before the fault, to the faulted controller. Whereby, the faulted controller is restarted soon by the thus retransmitted control program and the related parameters. Thus, satisfactory backup for the fault is provided.

The supervisory computer may have a standby memory area for storing alternative control modes and/or parameters for individual controllers and a memory switch means for transferring the alternative control parameters of a controller to that portion of the memory which carries control parameters of that controller. Accordingly, the manner of operation of any controller can be easily changed during the operation simply by changing its control modes and/or parameters stored in the supervisory computer from those being used to those stored in the standby memory area and developing and transmitting a new control program based on the thus changed control modes and/or parameters.

In another embodiment of the process control system of the invention, at least one of the above-mentioned controllers is made a standby controller, while the remainder thereof act as non-standby controllers. The controllers are connected to the objects being controlled through selective input/output switches which are adapted to allow switching of any of the non-standby controllers for a specific object to the standby controller. A switch control means for connecting and disconnecting the standby controller is included in the supervisory computer.

In response to a fault detection signal from any faulted controller, the switch control means transmits the control program and control information of the faulted controller to the standby controller, replaces the faulted controller with the standby controller in the operation of the supervisory computer, and turns said selective input/output switches so as to switch the faulted controller for a specific object to the standby controller. Accordingly, the faulted controller is automatically switched to the standby controller without interruption of the process control system.

Further, a fault diagnosis means responsive to a fault detection signal from any faulted controller may be provided in the supervisory computer. In response to the fault detection signal, the fault diagnosis means may dispatch a fault diagnosis program to the faulted controller after its isolation from the process control system by the above-mentioned switch control means, so as to diagnose the fault of the faulted controller.

BRIEF DESCRIPTION OF THE DRAWINGS

For a better understanding of the invention, reference is made to the accompanying drawings, in which.

Like parts are designated by like numerals and symbols throughout different views of the drawings.

DESCRIPTION OF THE PREFERRED EMBODIMENT

This invention will be described in further detail now, by referring to FIG. 4 through FIG. 9. The process control system of the invention uses a plurality of controllers 1 for distributed processing which are connected to a supervisory computer 3 through transmission lines 2. The improvement of the invention is in the formations of the individual controllers 1 and the supervisory computer 3 and in the configuration of the software used in the system.

Figure 4:
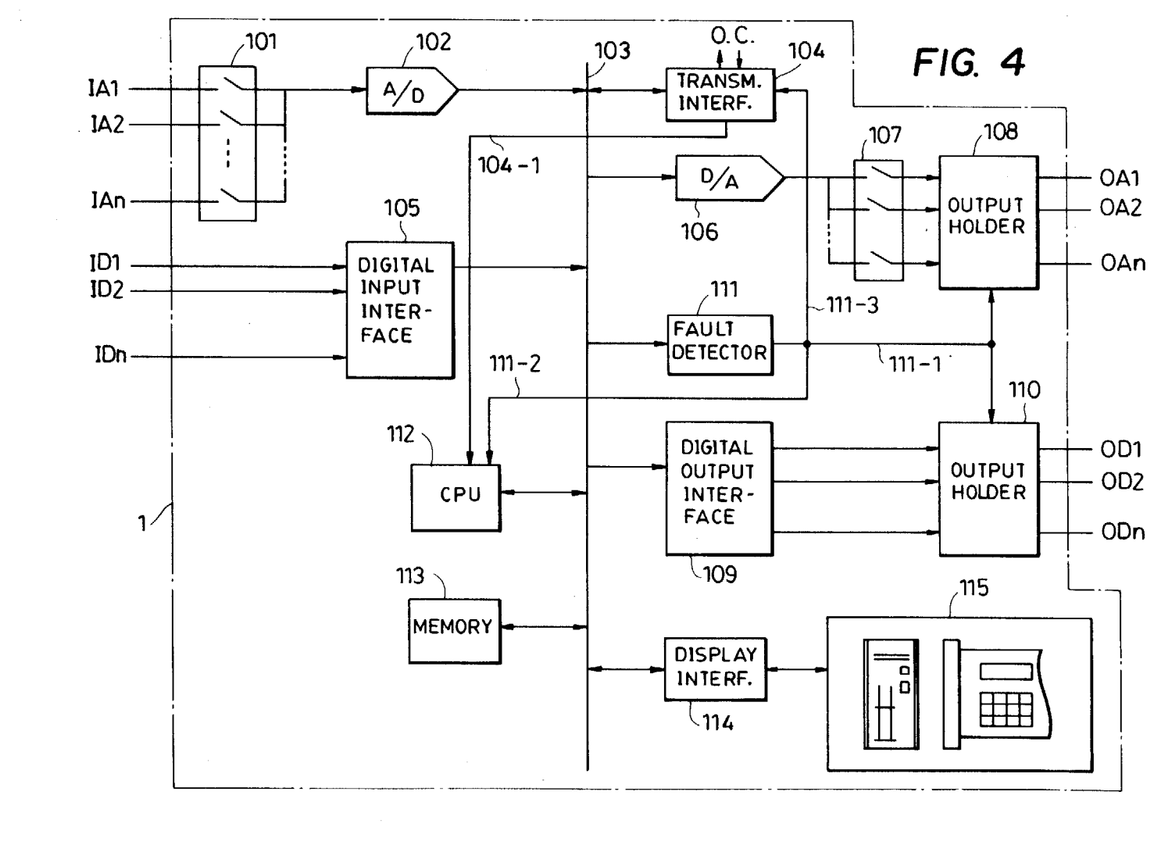
FIG. 4 is a schematic block diagram of a controller for distributed processing according to the present invention.

FIG. 4 shows a block diagram of an embodiment of the controller 1 to be used in the process control system of the invention. The difference between the conventional controller 1 of FIG. 2 and the embodiment of FIG. 4 is only in that the fault detector circuit 111 of the embodiment of FIG. 4 is connected to the CPU 112 through a reset line 111-2, to the transmission interface circuit 104 through a trigger line 111-3 and to output holders 108 and 110 through hold line 111-1.

Figure 5:
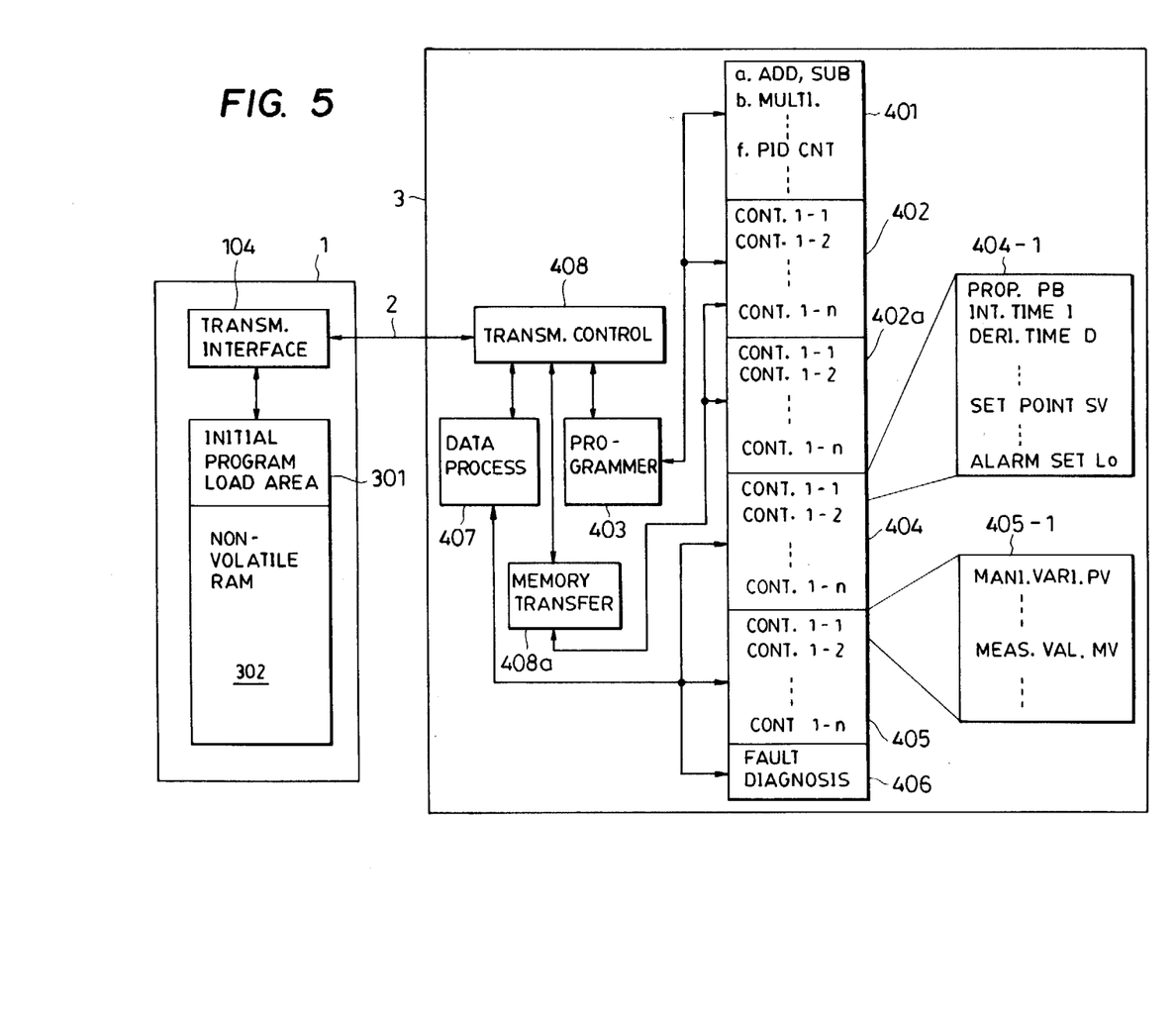
FIG. 5 is an explanatory diagram of the software which is used in the process control system of the present invention.

FIG. 5 is a block diagram showing the configuration of software in the controller 1 and those portions of the software of the supervisory computer 3 which directly relate to the controllers 1. The software of the controller 1 is essentially made of two portions, namely an initial loader program and control program which is writable. The initial loader program is preferably in the form of firmware stored in an initial program load area 301 of the memory 113, while the writable control program is stored in the random access memory (RAM) area 302 of the memory 113. The RAM area 302 is preferably made non-volatile or provided with a backup battery.

The initial loader program in the initial program load area 301 fulfils the following functions; namely (i) in response to a power source reset signal and a reset signal on the reset line 111-2 from the fault detector circuit 111, to clear the RAM area 302, to hold output levels at the output holders 108 and 110, and to halt and wait for next transmission, (ii) in response to signals on the interrupt line 104-1 from the transmission interface circuit 104, to load a transmitted control program at predetermined addresses of the RAM area 302, (iii) in response to signals on the interrupt line 104-1 from the transmission interface circuit 104, to load transmitted control parameters and transmitted temporary parameters at predetermined addresses of the RAM area 302, and (iv) in response to that interrupt signal which indicates the completion of the transmission of the control program, the control parameters, and the temporary parameters, to release the hold of the output levels and to start the control operation.

The controller-related portion of the supervisory computer 3 has memory areas and processing means as shown in FIG. 5 for fulfilling the following functions.

(i) Operating module area 401, for storing all the operating modules or program modules or subroutines which are necessary for carrying out any expected loop controls.

More particularly, the operating module area 401 stores all the operating modules 203a through 203n of FIG. 3A for all the controllers 1-1 through 1-n of FIG. 1 under the supervision of the computer 3. The operating modules stored in the operating module area 401 are used in common by all the controllers 1-1 through 1-n.

(ii) Control loop/mode area 402 and standby memory area 402a, for storing loop from formations and control modes of all the controllers 1-1 through 1-n under the supervision of the computer 3.

More particularly, the control loop/mode area 402 stores the software wirings 202 of FIG. 3A or FIG. 3C for all the controllers. The function of the standby memory area 402a will be described hereinafter.

(iii) A programmer means 403, for making a control program for any controller by editing the operating modules of the area 401 based on the software wiring of the area 402.

(iv) Control parameter area 404, for storing control parameters of all the controllers 1-1 through 1-n under the supervision of the computer 3.

As an example, a control parameter area 404-1 for the first controller 1-1 is shown in detail; namely, control parameters such as the parameters of P.I.D. control action covering the proportional gain PB, the integral action rate I, the derivative action time constant D, various set points SV, alarm set values Lo, and the like.

(v) Temporary parameter area 405, for storing temporary parameters of all the controllers 1-1 through 1-n under the supervision of the computer 3.

As an example, a temporary parameter area 405-1 for the first controller 1-1 is shown in detail; namely, temporary parameters such as the magnitude of a manipulated variable PV given from the controller to a process being controlled, the measured value of a controlled variable MV, on-off levels of digital input signals, on-off levels of the digital output signals, and the like.

(vi) Fault diagnosis program area 406, for storing a fault diagnosis program to be described hereinafter.

(vii) Data processing means 407, for editing data from the above-mentioned areas.

(viii) Transmission control means 408, for controlling signals to be transmitted and stored, and a data transfer means 408a, for transferring data stored in the standby memory area 402a.

Figure 9:
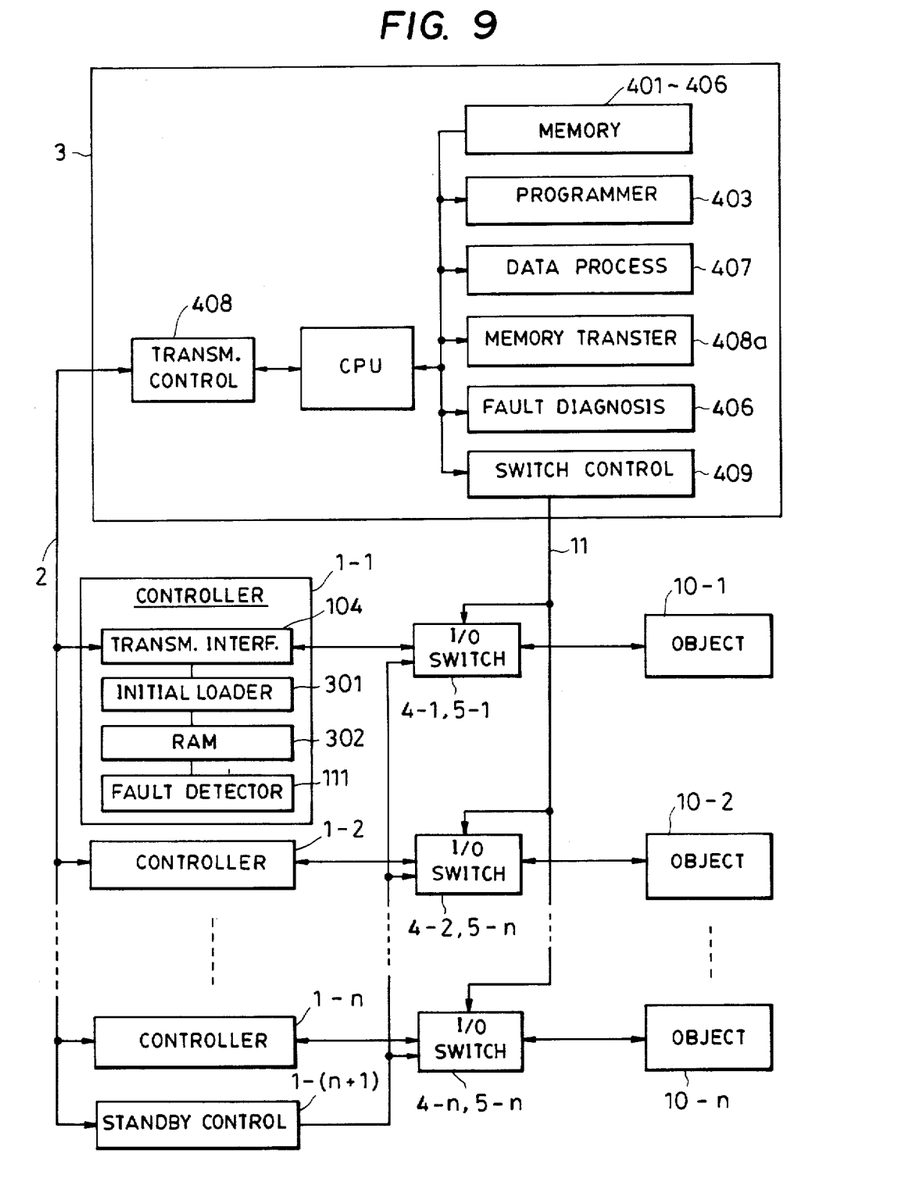
FIG. 9 is a block diagram illustrating the relationship among different functions in the process control system of the invention.

The block diagram of FIG. 9 shows various functions of the supervisory computer 3 which are carried out under the control of its own CPU, together with the relationship of such computer functions with the functions of the controllers 1-1 through 1-n.

The operation of the process control system of the invention will be described now by referring to the flow chart of FIG. 6 and the block diagram of FIG. 9. When the operation starts, input information is written in the supervisory computer 3 in a step 601. More particularly, the loop formations and control modes of the controllers 1 under the supervision of the computer 3 are loaded in the control loop/mode area 402 of the memory of the supervisory computer 3. Such loading of the loop formation and the control modes corresponds to the writing of the software wiring 202 on the ROM 203 by a ROM writer in the conventional controller for distributed processing. Further, control parameters and temporary parameters are written in the control parameter area 404 and the temporary parameter area 405 of the supervisory computer 3.

After the input information is written, in a step 602, the programmer means 403 of the supervisory computer 3 writes a control program for a specific controller 1 by selecting and editing the operating modules stored in the module area 401 based on the software wiring of the specific controller stored in the control loop/mode area 402. Even after the completion of the editing of the control program, the operating modules and the software wiring information such as the loop formation and the control mode are retained in the module area 401 and the control loop/mode area 402.

On the side of the controllers 1 under the supervision of the computer 3, as the power source is switched on, the initial loader means stored in the initial program load area 301 is started, so as to reset the RAM area 302 and wait for signal transmission form the supervisory computer 3. During this waiting condition by controller 1, the computer 3 proceeds to a step 603 and transmits the control program edited by the programmer means 403 toward the specific controller 1 under the control of the transmission control means 408. The specific controller 1 receives the control program and loads it at predetermined addresses of the non-volatile RAM area 302 thereof in a step 604.

In a succeeding step 605, the supervisory computer 3 transmits the control parameters of the specific controller 1 to that controller 1, and the controller 1 loads them at predetermined addresses of the non-volatile RAM area 302 thereof in a step 606. In a next step 607, the supervisory computer 3 transmits the temporary parameters of the specific controller 1 to that controller 1, and the controller 1 loads them at predetermined addresses of the non-volatile RAM area 302 thereof in a step 608.

Thus, the preparation for the operation is completed, and in a step 609, the controller 1 releases its output hold and actually starts its operation in a step 610. During operation, the controller 1 samples its control parameters and temporary parameters at suitable intervals and transmits them to the supervisory computer 3 in a step 611. The supervisory computer 3 updates the information stored in its control parameter area 404 and temporary parameter area 405 by using data transmitted from the controller 1 in a step 612. Unless any other steps are instructed, the logic of a step 613 instructs the iteration of the renewal of the control parameters and the temporary parameters, so as to keep them updated.

Except for the above-mentioned initial loading of the controllers and the updating of the control and temporary parameters, the operation and handling of the running controllers 1 are essentially the same as those of the prior art.

Figure 6:
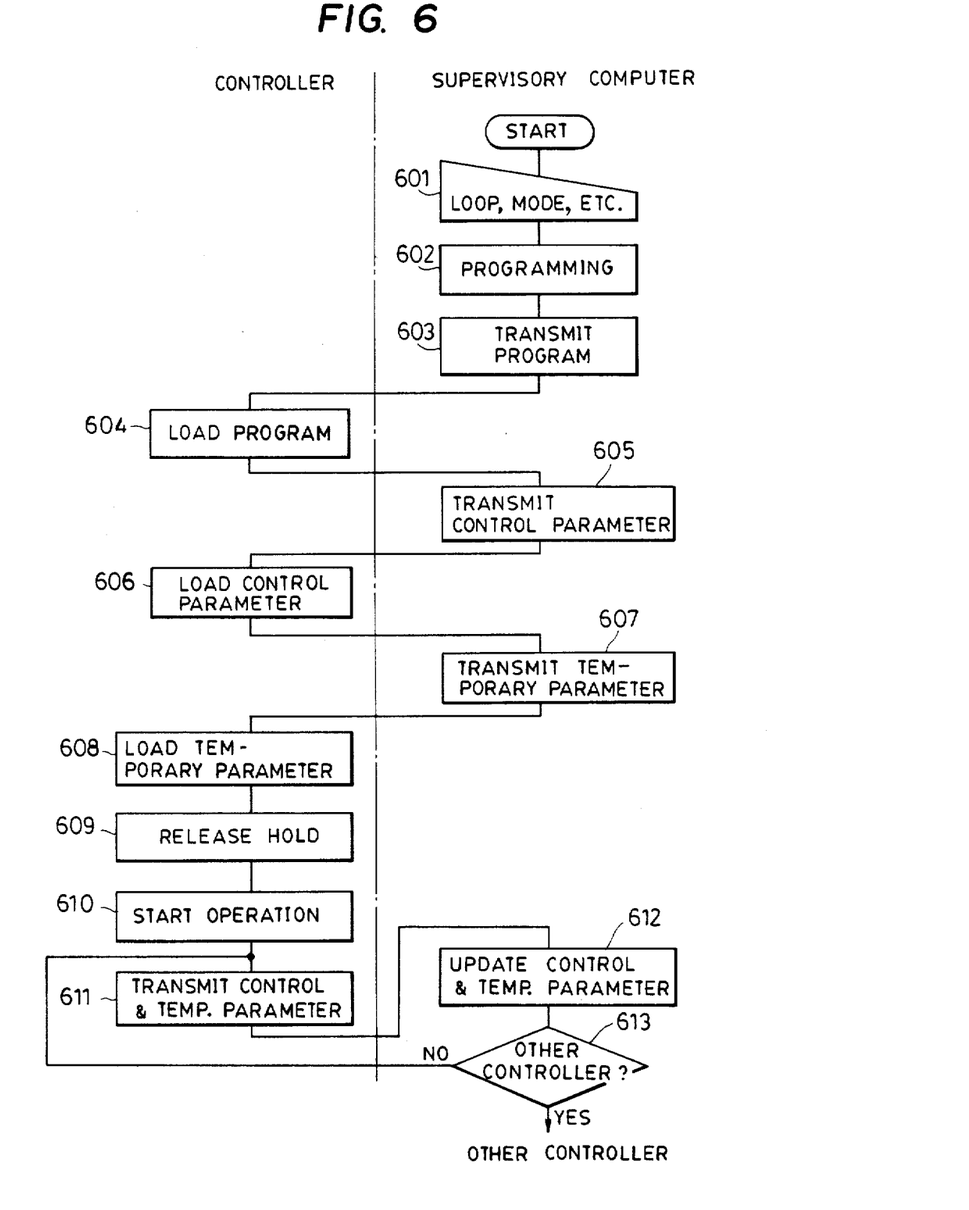
FIG. 6 and FIG. 8 are flow charts of control programs in the process control system of the invention.

In FIG. 6, the initial loading and the updating of the parameters are shown only for one specific controller 1, but it should be understood that similar initial loading is effected in succession to every controller 1-1 through 1-n, so as to ensure the updating of the parameters in every controller. Although it is implied that the controllers 1-1 through 1-n under the supervision of the computer 3 are started in succession, it is also possible to complete the initialization of all the controllers 1-1 through 1-n at first and then start them at once.

The following operations are possible in the process control system of the above formation.

I. Change of control mode during operation

The changing of the control mode is rather frequently required even during operation. Typical cases requiring it are as follows: namely, (i) At the start up of a plant, the operating characteristics of the plant are measured at first and then the control parameters are determined based on them before proceeding into actual operation.

(ii) At the start up of a plant, a special start up sequence is used for achieving a certain optimal goal, such a minimization of start up energy, and after the operation is stabilized, the control is shifted to the regular P.I.D. control or the like.

(iii) The regular P.I.D. control is used during the stabilized running of the plant, and to stop the plant, a special sequence control and a special control algorithm intrinsic to the plant are used until the plant comes to complete rest.

In the above cases, if the required change of control can be accomplished by modification of the parameters alone without changing the loop formation and the control modes, the conventional controllers can deal with such control change. However, if modification of the control program including any change in the loop formation and/or the control mode is required, the conventional controllers cannot deal with it. Heretofore, two or more different controllers are installed and the required change of control is effected by switching the controllers. However, the installation of such different controllers is a kind of duplication and uneconomical.

To facilitate the change of control mode during operation, a preferred embodiment of the process control system according to the present invention uses a standby memory area 402a in the memory of the supervisory computer 3, as shown in FIG. 5. In addition to the data stored in the control loop/mode area 402, one or more control loop/mode data which are different from those in the area 402 are stored in the standby memory area 402a for each controller 1-1 through 1-n. Normally, the controllers 1 are run by the data in the control loop/mode area 402.

When a change in the control mode of the controller 1, for instance the controller 1-i, is required, the data for the controller 1-i stored in the standby memory area 402a is transferred to the control loop/mode area 402 by the data transfer means 408a of FIG. 5. The programmer means 403 writes a new program by using the data in the control loop/mode area 402 after the above transferring, and transmits the thus written new program to the controller 1-i. Whereby, the control mode of the controller 1-i can be changed during the operation without interrupting the operation of the process control system.

In the above change of the control mode, to avoid occurrence of any absence of control during the period for loading the new control program, any of the following steps may be taken.

(i) The output from the controller is temporarily held at a suitable level for the period of the above-mentioned change of control program.

(ii) Backup with a standby controller to be described hereinafter is used during the period of the above-mentioned change of control program.

(iii) The rate of transmission is increased.

Unless the response of the process being controlled is extremely quick, the regular transmission rate of the control program and the data between the supervisory computer 3 and the controller 1 is fast enough the avoid any difficulty by either one of the above steps.

When very quick transmission is necessary, it is possible to use optical transmission lines and direct memory access (DMA) control program mode which can be actuated by interruption control.

II. Measures for runaway of controller

Steps to be taken in the case of runaway of CPU 112 of the controller 1 during operation will be described now by referring to FIG. 4 and FIG. 9. When runaway occurs in the controller 1, the fault detector circuit 111, such as a watchdog timer, detects it and produces a hold signal on the hold line 111-1. In response to the hold signal, the output holders 108 and 110 hold their outputs at the levels immediately before the occurrence of the runaway. Simultaneously, the fault detector circuit 111 gives a reset signal on the reset line 111-2 and a trigger signal on the trigger liner 111-3. In response to the reset signal, the CPU 112 is reset and the initial loader means in the initial program load area 301 is started and waits for transmission from the supervisory computer 3. The trigger signal on the trigger line 111-3 is transmitted to the supervisory computer 3 through the transmission interface circuit 104 and the transmission line 2, so as to notify the computer 3 of the occurrence of the runaway.

In response to the trigger signal from the controller 1, the supervisory computer 3 rewrites the control program for the runaway-detected controller 1 by editing the operating modules of the module area 401 based on the software wiring information of the runaway-detected controller 1 stored in the control loop/mode area 402. The transmission control means 408 transmits the thus rewritten control program to the runaway-detected controller 1 through the transmission line 2. Further, the supervisory computer 3 transmits the control parameters and temporary parameters of the runaway-detected controller 1 immediately before the occurrence of the runaway back to that controller 1, and when the transmission is completed, an interrupt signal at the time of completion of the transmission is sent to the CPU 112 of that controller 1. In response to the interrupt signal at the completion of the transmission, the CPU 112 of that controller 1 releases the above-mentioned temporary hold and resumes the control operation.

Thus, with the process control system of the present invention, automatic restart in the case of runaway of a controller 1 is provided.

III. Backup of the process control system

The backup arrangement in the process control system of the invention will be described now by referring to FIG. 7, FIG. 8, and FIG. 9.

Figure 7:
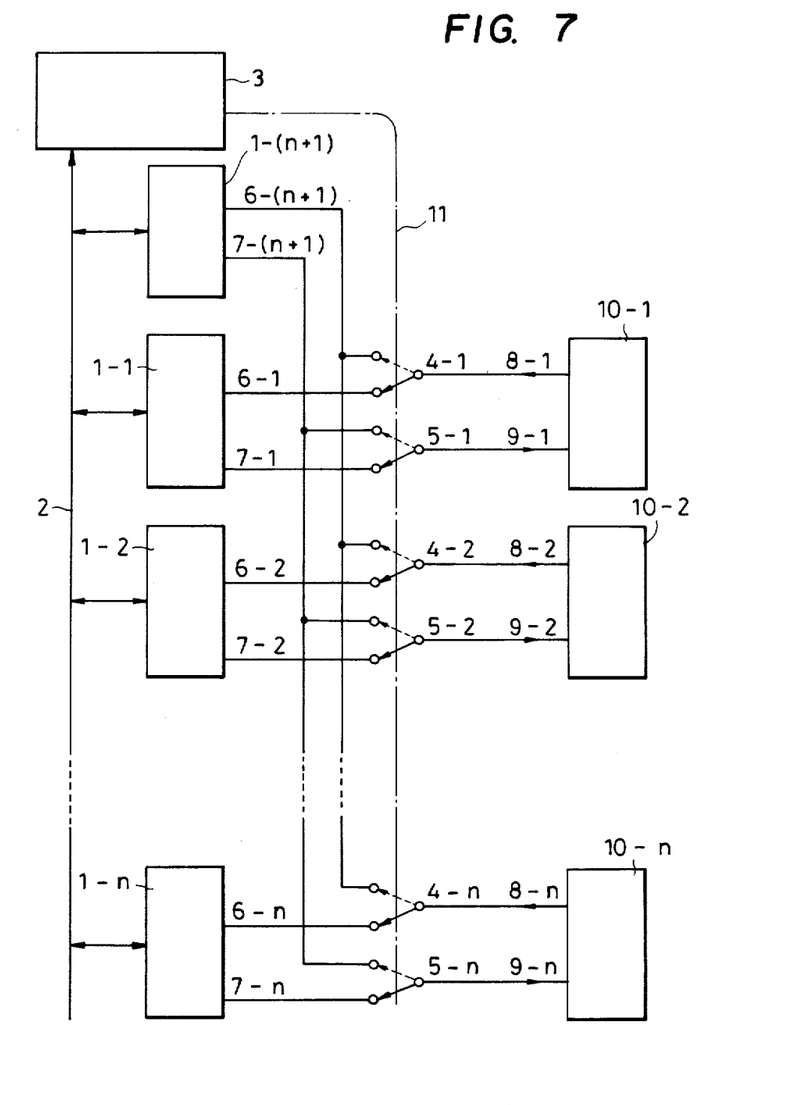
FIG. 7 is a block diagram showing the relationship among controllers for distributed processing, individual objects controlled by the controllers, and a supervisory computer.

In FIG. 7, the regular controllers 1-1 through 1-n (sometime collectively referred to as the "regular controller 1", hereinafter) connected to the supervisory computer 3 through the transmission line 2 effect process control of single-loop or multi-loop type, respectively. The controllers 1-1 through 1-n have the same configuration as that shown in FIG. 4 and FIG. 5, and they are connected to objects to be controlled 10-1 through 10-n (sometimes collectively referred to as the "object 10", hereinafter) for controlling various variables, such as temperature, pressure, flow rate, and the like. FIG. 9 shows the connection of a standby controller 1-(n+1) in a preferred embodiment of the invention. In this embodiment, one standby controller 1-(n+1) with the same configuration as the regular controllers is provided for n units of the controllers 1-1 through 1-n.

Each of input lines 6 and 8 (collectively representing the input lines 6-1 through 6-n and 8-1 through 8-n) from the object 10 to the regular controller 1 includes a plurality of line elements for providing the analog input signals IA1 through IAn and the digital input signals ID1 through IDn of FIG. 4, but it is shown as a single line for simplicity. Similarly, each of output lines 7 and 9 (collectively representing the output lines 7-1 through 7-n and 9-1 through 9-n) from the regular controller 1 to the object 10 also includes a plurality of line elements for providing the analog output signals OA1 through OAn and digital output signal OD1 through ODn of FIG. 4, but it is shown as a single line for simplicity.

An input switch 4 (collectively representing input switches 4-1 through 4-n) and an output switch (collectively representing output switches 5-1 through 5-n) are to switch the input/out of a faulted regular controller 1-i to the input/output of the standby controller 1-(n+1) upon detection of the fault in the regular controller 1-i. Each of input/output lines of the standby controller 1-(n+1) also has a number of line elements because it must be switched with the input/output lines of any regular controller 1, but for simplicity it is shown by a single line. The input switch 4 and the output switch 5 are connected to a switch control means 409 of the supervisory computer 3 through a switch control line 11.

The operation of the standby controller 1-(n+1) will be described now by referring to the flow chart of FIG. 8 and the block diagram of FIG. 9. During normal operation, the input switch 4 and the output switch 5 assume the solid line positions of FIG. 7. When a fault is detected by the fault detector circuit 111 of FIG. 4 for a regular controller 1-i as shown in a step 801 of FIG. 8, a hold signal is given to the output holders 108 and 110 through the hold line 111-1 for holding the output signals thereof at levels immediately before the fault as shown in a step 802. At the same time, a detection signal is transmitted to the supervisory computer 3 through the trigger line 111-3 and the transmission interface circuit 104 of the faulted regular controller 1-i as shown in a step 803.

In response to the detection signal, the supervisory computer 3 edits a control program for the faulted controller 1-i based on the control information therefor stored in the control loop/mode area 402 as shown in a step 804. At the same time, the initial loader means at the initial load program load area 301 of the standby controller 1-(n+1) is started so as to wait for signal transmission from the supervisory computer 3. Under the condition that the standby controller 1-(n+1) is waiting, the supervisory computer 3 transmits the rewritten control program of the controller 1-i to the standby controller 1-(n+1) as shown in a step 805. The standby controller 1-(n+1) receives and loads the rewritten control program in its non-volatile RAM area 302 as shown in a step 806. The data for the faulted controller 1-i stored in the control parameter area 404 and the temporary parameter area 405 of the supervisory computer 3 are transmitted and loaded in the standby controller 1-(n+1) as shown by steps 807 and 808.

Figure 8:
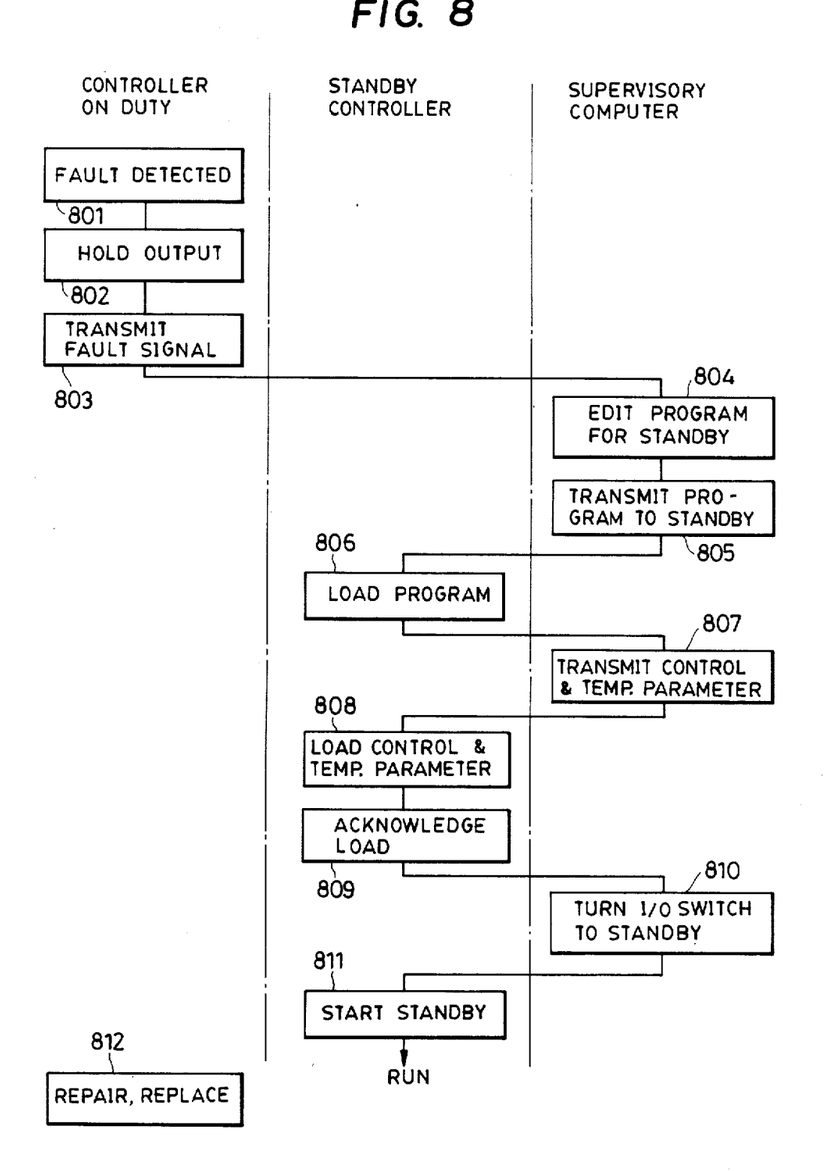

When a signal acknowledging the above-mentioned loading is transmitted as shown in a step 809, the switch control means 409 of the supervisory computer 3 turns the input switch 4-i and the output switch 5-i for the faulted controller 1-i to the standby side or the broken line side of FIG. 7 in a step 810 of FIG. 8. Then the operation of the standby controller 1-(n+1) is started in lieu of the faulted controller 1-i as shown by a step 811. Since the faulted controller 1-i is now isolated from the process control system, it can be checked and repaired, or replaced with a sound controller as shown in a block 812 of FIG. 8.

The restoration from the standby controller 1-(n+1) to a repaired or replaced sound regular controller 1-i is done in a sequence which is the same to the above sequence for connecting the standby controller 1-(n+1) except that the switchings of the sound regular controller and the standby controller are reversed. More particularly, the control program, and control parameters, and the temporary parameters are loaded in the regular controller 1-i, and then the input switch 4-i and the output switch 5-i are turned to the normal sides or the solid line position of FIG. 7 before the restored controller 1-i is put in service.

In another embodiment of the invention, automatic fault diagnosis may be effected at the faulted controller. Namely, when a faulted regular controller 1-i is isolated from the process control system after the standby controller 1-(n+1) is put into service, a fault diagnosis program 406 (FIG. 9) may be transmitted from the supervisory computer 3 to the faulted controller 1-i. The outcome of the fault diagnosis program may be sent back to the automatic computer 3 for automatic determination of the type of fault.

As described in detail in the foregoing, a process control system according to the present invention uses a plurality of controllers for distributed processing, which controllers are connected to a supervisory computer, and the control program for each controller is written in the supervisory computer and transmitted and loaded in each controller. During operation, various control data at each controller is continuously transmitted to the supervisory computer so as to update the data stored therein, whereby the following effect is obtained.

(a) The RAM area of each controller stores only those control program and data which are necessary for effecting the control through its own control loop without wasting the memory area by storing unnecessary operating modules therein, so that the entire RAM area is effectively used and the cost-performance relation of the process control system is improved.

(b) With a memory of given magnitude, the controller in the system of the invention can perform more advanced control function than in conventional systems.

(c) The control loop and control mode are edited not manually by a complicated ROM writer but automatically by a supervisory computer, so that the work of editing them is simplified. Further, with possible use of cathode ray tube graphics, one may easily check the contents of the control program in the process of editing it.

(d) Since all the controllers in the system of the invention have an identical hardware structure and no individuality in the hardware is required, the replacement of the controller is very easy without any change of ROM. Thus, the inter-changeability of the controller is greatly improved.

(e) Due to the same reason as in the preceding paragraph, the test and adjustment of the controller can be simplified, and considerable labour saving is achieved.

(f) The loop formation and the control mode of each controller can be easily changed by simple operation of the supervisory controller, so that the system of the invention can easily meet changes in the process being controlled and in the method of control. Thus, the flexibility of the process control system is improved.

(g) The backup for a faulted controller is simplified, and one standby controller can be used in common for a number of controllers having different loop formations and control modes.

(h) Automatic restart of a controller in case of its CPU runaway is provided.

(i) Automatic fault diagnosis of a faulted controller can be effected by transmitting a fault diagnosis program to it from the supervisory computer.

What is claimed is:

1. A process control system for controlling process variables of a process at different portions thereof, the process control system comprising:

a plurality of controllers coupled to a process at different portions thereof to control process variables thereat, each controller having, coupled together, an initial load means for loading, an input interface means for receiving input signals representing measured value of a process variable being controlled, an output interface means for sending out output signals to a corresponding portion of the process, a random access memory (RAM) means, a central processing unit (CPU), a fault detector circuit producing a detection signal upon detection of controller runaway, and a transmission interface, said RAM means for storing a control program and control information including a set point of the process variable being controlled and the measured value of said process variable, said CPU running said control program so as to produce the output signals based on said input signals and said control information, said output signals acting on said portion of the process so as to minimize difference between said set point and said measured value of the variable being controlled;

a supervisory computer having, coupled together, a memory means for storing the control informations of said controllers, said control informations covering said set points of the variables being controlled, operating modules for effecting mathematical operations, operating loops, operating modes, parameters of the controllers and said detection signals, said operating modes being formulated by said supervisory computer by selectively combining said operating modules and said parameters so as to selectively produce different combinations of on-off, proportional, derivative, and integral control actions; a programmer means for automatically editing control programs for said controllers based on said control information; and a transmission control means controlling signal transmission both between said transmission interface of the controllers and said memory means and between said transmission interface of the controllers and said programmer means; and transmission lines extending between said transmission interfaces of the controllers and said transmission control means of the supervisory computer, whereby, said supervisory computer selectively transmits initial control programs and initial parameters to individual controllers for loading therein through said initial loader means so as to start said controllers with the initially loaded control programs and parameters, while during operation each controller samples relevant control parameters through said means for receiving input signals and transmits the sampled parameters to said supervisory computer so as to update the control parameters stored in the memory means thereof, and in response to the detection signal said programmer means of the supervisory computer automatically edits the control program of the runaway-detected controller immediately before the runaway based on the updated control information and said transmission control means of the supervisory computer transmits the thus edited control program to the runaway-detected controller.

2. A process control system as set forth in claim 1, wherein said supervisory computer further includes a standby memory means for storing alternative control information covering at least operating loops and operating modes of the individual controllers, and a memory transfer means for transferring the alternative control information stored in said standby memory means to said memory means and for renewing said control information stored in said memory means by the thus transferred information, and in response to the renewal of the control information said programmer means renews the control program of the relevant controller based on the renewed control information and the transmission control means of the supervisory computer transmits the thus renewed control program to the relevant controller so as to renew the control program thereof for changing operating mode thereof without interrupting operation thereof.

3. A process control system as set forth in claim 1, wherein said process control system further comprises at least one standby controller substantially similar to said plurality of controllers, said controllers being connected to said different portions of the process through a corresponding plurality of selective input/output switches adapted to allow switching of any of the non-standby controllers for a specific portion of the system to the standby controller, each of said controllers having said fault detector circuit capable of detecting a fault therein, said fault detector circuit transmitting a detection signal to said supervisory computer when a fault is detected; and said supervisory computer further includes a switch control means responsive to said detection signal for responding to the detection signal from the fault detector circuit of any faulted controller and for transferring the control program and control parameters of the faulted controller to the RAM means of the standby controller and replacing the faulted controller with the standby controller through the operation of said transmission control means, and for switching said selective input/output switches so as to switch the faulted controller for the specific portion of the process to the standby controller, whereby the faulted controller is automatically switched to the standby controller without interrupting operation of the process control system.

4. A process control system as set forth in claim 3, wherein said supervisory computer further includes a fault diagnosis means, responsive to said detection signal from the fault detector circuit of a faulted controller, for dispatching a fault diagnosis program to said faulted controller after said switching of the faulted controller to the standby controller.

* * * * *